Nov. 7, 1950   E. A. BRASS   2,528,733
CROSSING GATE
Filed March 30, 1945   2 Sheets-Sheet 2

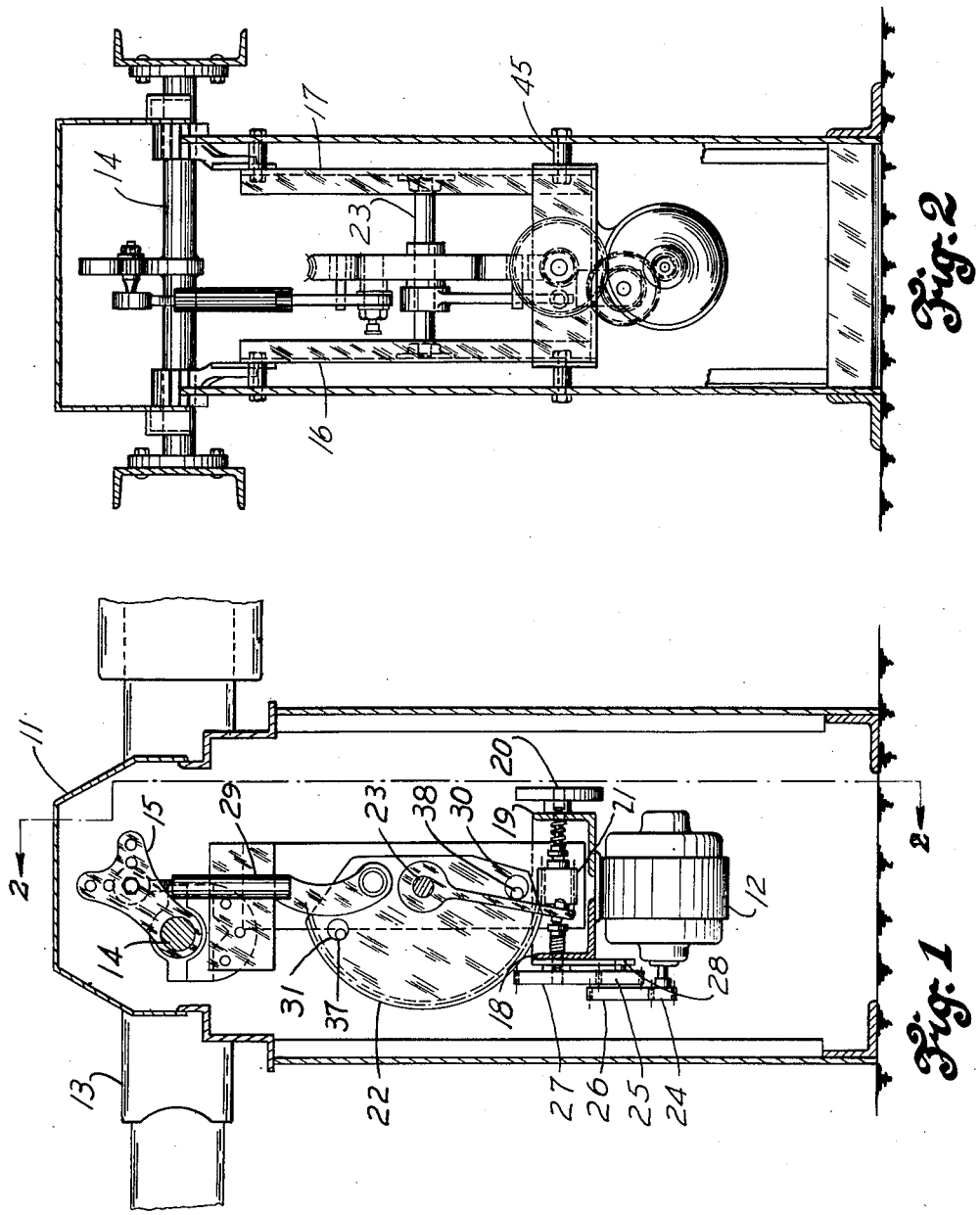

INVENTOR.
Edward A. Brass
Roy M. Eilers
Attorney
BY

Patented Nov. 7, 1950

2,528,733

UNITED STATES PATENT OFFICE 2,528,733

CROSSING GATE

Edward A. Brass, Shreveport, La.

Application March 30, 1945, Serial No. 585,695

11 Claims. (Cl. 39—7)

My invention relates to automatic crossing gates, that is, to gates adapted to be located adjacent to the intersection of highways and railways for preventing users of the highway from crossing the railway when a train is approaching the intersection.

More particularly, my invention relates to the type of gate wherein a motor driven actuating mechanism is employed to raise and lower the gate; and especially to a means of providing a safe, positive brake mechanism for stopping the gate movements at their extreme positions.

Crossing gates are usually provided with a brake mechanism either in connection with, or separate from, the driving mechanism itself, wherein brakes are applied and released each time the energizing circuit is broken or cut in at the extreme gate movements. Occasionally, however, brake systems have been known to fail, driving the gate into overhead power or communication lines above the track or crossing. Since there is danger in the continued movement of the gate when the brake system fails to function, one of the objects of this invention is to provide a positive brake action to the gate movements, with means for stopping the gate at a predetermined angular setting.

Another object is to utilize the momentum set up in the transmission of the device as the power to actuate the brake mechanism and to provide a means of increasing the braking pressure to the rotating members after the gate has passed the angular setting.

A further object of this invention is to provide, as a safety feature, means for stopping all arm movements by disengaging certain gears at a point just beyond the limit of the gate travel in the raised or lowered position and to provide means of restoring these gears to normal operation without substantial harm to any member.

These and other objects of my invention should become apparent from an examination of the specifications and the accompanying drawings in which:

Figure 1 represents a longitudinal section taken through the gate part illustrating the application of my improved mechanism.

Figure 2 shows a side elevation of the same taken on section 2—2 on Figure 1.

Figure 3:
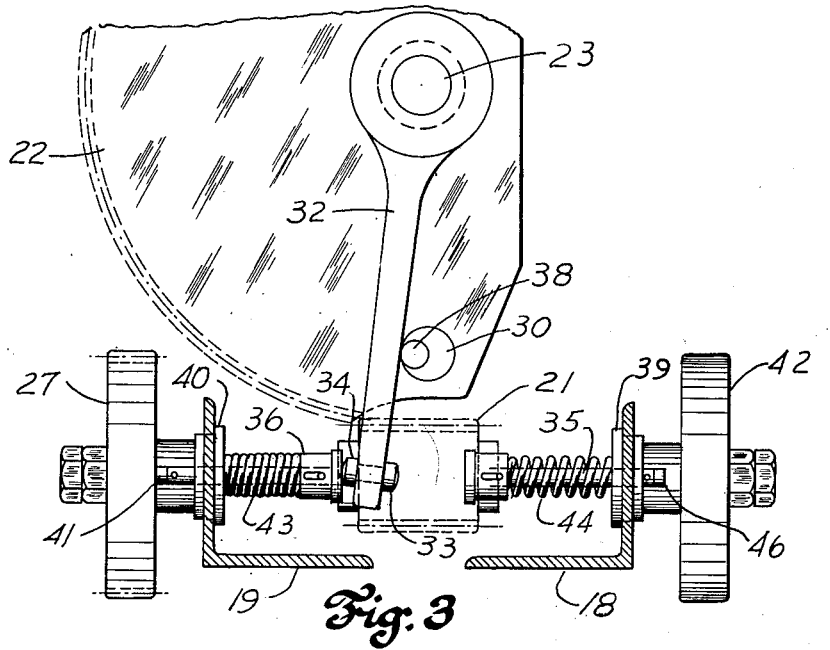
Figure 3 is an enlarged view showing brakes being applied at one end of extreme gate movement.
Figure 4:
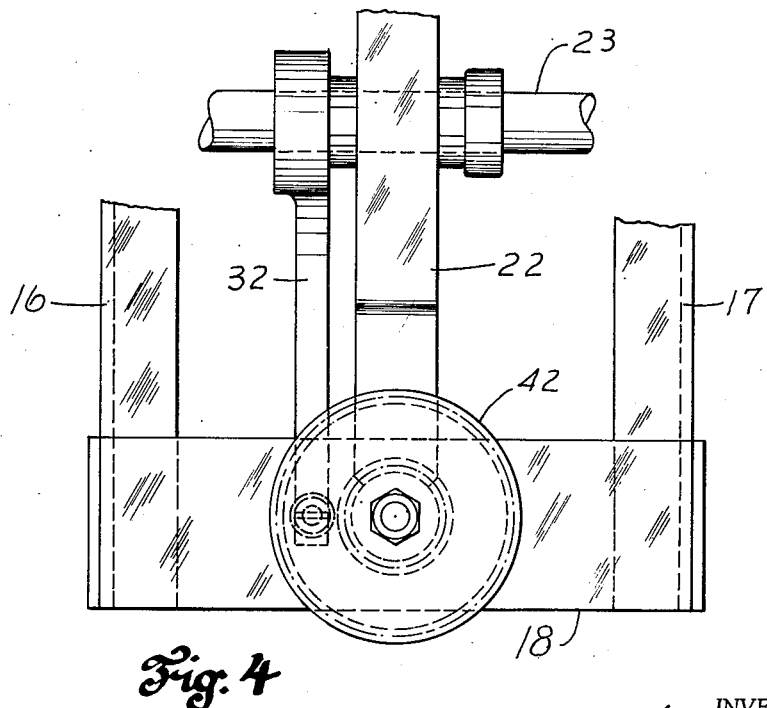
Figure 4 shows a side elevation taken at the right hand of Figure 3.

As shown in the drawing, I provide a suitable housing 11 designed to exclude water, dust and the like; with a motor 12 and gate 13, the latter being mounted on a journaled shaft 14 which carries a bell crank lever 15; said lever having holes provided, preferably three, so that the raised or clear position of the gate may be adjusted to suitable elevations as for example 50, 70, or 90 degrees, from its lowered or traffic obstructing position. Within the housing 11, and forming the vertical supports for the mechanism, are two members 16 and 17. Around the base portions of said members, and integrally connected to same, are cross members 18 and 19, carrying a journaled worm shaft 20 and a worm 21 thereon designed to drive a wormwheel segment 22 whose shaft 23 is mounted in the two vertical supports 16 and 17. A suitable gear train is provided between the motor shaft and the worm shaft 20 consisting of driving gears 24 and 25 and driven gears 26 and 27; the idler gear being carried on a supporting member 28 integrally connected to the frame cross member 18. The shaft 23 actuates a suitable electrical limit switch, not shown on the drawings, consisting of a base, means for mounting, and electrical contacts properly timed to control the gate movements by the motor.

It is to be noted here that the limit switch is operated automatically upon the approach of a train in the vicinity of a roadway crossing; and the electrical circuit will be held closed just long enough to allow the driving motor to start the gate on its travel toward the opened or closed position as the case may be. After the gate arm has gained sufficient momentum to convey it to its extreme raised or lowered position, the limit switch breaks the electrical circuit to the motor and allows the balanced gate to travel under its own momentum to its extreme position.

Extending from the other end of the bell crank lever 15 to the wormwheel segment 22 is an adjustable connecting rod 29 operatively connected to the web of the wormwheel segment 22. It will be apparent from the construction shown that after the desired angular setting has been made by placing the pivoted connecting rod 29 in the proper hole in the bell crank lever 15, that a final and accurate setting may be made by the adjusting threads provided in the connecting rod assembly. It will also be apparent that the above angular settings are maintained after adjustment since any movement of the driving worm 21 in either direction, subsequent to the breaking of the energizing circuit, and in excess to that of the desired setting, will cease when the teeth on the worm and wormwheel segment 22 disengage; said excess rotative movement having no effect on the segment itself.

It will be further apparent that, after the above settings have been made, the braking action hereinafter described and the points of disengagement of the worm 21 and wormwheel segment 22 may be adjusted and set for particular rotative movement by means of eccentric bushings 30 and 31 provided in the web of the wormwheel segment 22.

On the shaft 23 and pivotally connected to same is a driving member 32 having hardened pins 33 and 34 in one end and so positioned that said pins will contact ends of brake rods 35 and 36; said driving member 32 being driven by pins 37 and 38 placed in said eccentric bushings 30 and 31 located in the web of the wormwheel segment 22; pins 33 and 34 of the driving member 32 coming in contact with the brake rods 35 and 36 when the extreme limits of the gate movements are reached.

A reference to the drawings will show that the entire brake assembly is mounted through suitable bushings or guides 39 and 40 through the lower cross members 18 and 19, in such a position as to allow, upon actuation, the brake shoe 46 to press against the inside flat portion of a given brake drum 42 on one end of the worm shaft 20 and to allow, upon actuation, the brake shoe 41 to press against a bronze gear 27 forming part of the gear train on the other end of the worm shaft 20. Fitted into the wormwheel segment 22 and properly spaced, are two eccentric bushings 30 and 31 which receive the aforementioned hardened driving pins 37 and 38; said pins driving the driving bar 32 against the brake rods 35 and 36.

From the drawings it will be apparent that the brake rods 35 and 36 are so placed and adjusted with reference to the point of disengagement of the worm 21 and wormwheel segment 22 that the necessary braking action for stopping the gate movement shall substantially occur just prior to the disengagement of teeth in the worm 21 and wormwheel segment 22. In order that the braking action may not occur with such abruptness that the worm 21 and wormwheel segment 22 after disengagement, will become damaged by the immediate reverse action of the gate, the movement is so designed that the braking action is applied directly to rotating members 42 and 27 with gradual and increasing pressure until all movements stop. Should the rotative movement be such in excess as to cause the teeth on the worm 21 and wormwheel segment 22 to disengage, as for example, the motor failing to stop, the reverse action of the cushioning springs 43 and 44 will be sufficient to bring the gate into such a position as to re-engage the worm 21 and wormwheel segment 22 for the reverse action by the motor. It is apparent also that the greater the distance traveled beyond the point of disengagement of the worm and wormwheel, the greater will be the braking pressure applied to the rotative movement. It will be noted that the yielding and braking action above referred to may take place at either end of the limiting positions of the gate; with means provided at each said position for separate brake adjustments by the eccentric bushings 30 and 31 located in the wormwheel segment 22.

The gate housing is provided with an opening covered by a cap or plate wherein access may be gained to the mechanism within. The motor has been placed beneath the gate mechanism and the movements are so designed in the vertical plan as to require a minimum amount of space. From the description given, it will be noted that to obtain the necessary balance in all of the movements, it is preferred that the gate arms be installed, together with their proper balancing weights, before any adjustments are made to the brake mechanism.

The parts are so designed that the assembled mechanical unit may be mounted by spacers 45 to the inside of the housing, thus obviating the necessity of a heavy base or support.

While I have illustrated and described a particular construction embodying my invention it is to be understood that the same may be variously modified without departure from the spirit or scope of the invention.

What I claim is:

1. A crossing gate comprising a gate, a frame, a shaft that is secured to and that carries said gate, said shaft being rotatively supported by said frame, a wormwheel segment, brake rods, a reversible worm and worm shaft for providing an oscillating movement for said wormwheel segment, members on said worm shaft that are in register with and are engageable by said brake rods, and means responsive to movement of said gate to cause said brake rods to engage said members and retard and halt rotation of said worm and worm segment whenever said gate approaches the limits of its travel.

2. In a crossing gate comprising a frame, an oscillating shaft, a gate secured to and oscillatable with said shaft, a wormwheel segment connected to said shaft and arranged to rotate with it, a driving mechanism for said oscillating shaft, a brake that is actuable to retard and stop said driving mechanism, a brake actuating member pivotally connected to said shaft, and means provided on said wormwheel segment for contacting said brake actuating member upon said wormwheel segment reaching its extreme limits of travel.

3. A crossing gate brake mechanism comprising a frame, a worm rotatably supported by said frame, a shaft rotatably supported by said frame, a wormwheel segment that is rotatably supported by said frame and is arranged to rotate to cause rotation of said shaft, a brake applying member, driving pins movable in response to rotation of said wormwheel segment, brake rods movable in response to movement of said driving pins, brake springs urging said brake rods out of braking position, driving gears adapted to cause rotation of said worm and a brake drum engageable by said brake rods to limit rotation of said worm.

4. In a crossing gate a brake mechanism comprising a housing, a frame within said housing, an oscillating shaft arranged to rotate between vertical members of said frame, a wormwheel segment connected to said oscillating shaft and having adjustable abutments thereon, a brake applying member pivotally connected to said shaft and positioned in register with said abutments of said wormwheel segment, and a brake, said brake-applying member being adapted to cooperate with said abutments on said wormwheel segment to apply said brake.

5. In a crossing gate a brake mechanism, comprising a shaft, a gate secured to and supported by said shaft, a wormwheel segment connected to said shaft, a brake applying member co-acting with abutments on said wormwheel segment, a worm arranged to drive said wormwheel segment; and spaced brakes, said wormwheel segment being adapted to cause said brake-applying member to oscillate between said brakes and being adapted to cause said brake-applying member to engage one or the other of said brakes and cause said brake to retard and halt rotation of said shaft when said worm and said wormwheel segment become disengaged.

6. In a crossing gate brake mechanism, a shaft, a wormwheel segment connected thereto, a worm shaft, brake rods enclosed by compression springs said wormwheel segment being so positioned relative to said worm shaft that said wormwheel segment can rotate into and out of engagement with the worm carried by said worm shaft, and means to provide reversible rotation of said wormshaft and thus provide reversible rotation of said wormwheel segment, one of said springs being compressible whenever said wormwheel segment is out of engagement with said worm, said springs being of sufficient strength and so arranged as to bring said wormwheel segment into a reengaging position with said worm after disengagement of said wormwheel segment from said worm.

7. In a device of the character described, the combination of a frame which comprises a plurality of vertically disposed supports, cross members extending between said supports and maintaining said supports in spaced relation, and bearings mounted on said supports, a shaft journaled in said bearings, a gate mounted on said shaft, a mechanism supported by said frame and connected to said shaft to oscillate said shaft, a housing, said frame enclosing said mechanism and being insertable into and removable from said housing as a unit, and holding members that are engageable with said frame and said housing to maintain them in assembled relation.

8. In a device of the character described, the combination of an integrated frame which comprises a plurality of vertically disposed supports, cross members extending between said supports and maintaining said supports in spaced relation, and bearings mounted on said supports, a shaft journaled in said bearings of said frame, a gate mounted on said shaft, a motor supported by said cross members of said frame, axles and gears supported by said frame, one of said gears being driven by said motor, connecting links between another of said gears and said shaft whereby said motor can drive said shaft, a housing, and holding members engageable with said supports of said frame and with said housing to maintain said frame in assembled relation with said housing.

9. In a device of the character described the combination of an oscillatable shaft, a gate carried by said shaft, a wormwheel segment rotatable when said shaft rotates, a worm gear adapted to cause rotation of said wormwheel segment, brakes that are selectively movable to braking position to stop movement of said worm or are movable out of braking position to permit unbraked movement of said worm, a brake-actuating element that is registerable with said brakes and is responsive to movement of said gate to engage said brakes and move them to braking position, and springs adjacent said wormwheel segment and said brakes, said springs being disposed adjacent the ends of travel of said wormwheel segment, said springs biasing said wormwheel segment toward said worm gear and biasing said brakes out of braking position, said brakes being yieldable to permit rotation of said wormwheel segment out of engagement with said worm and to permit movement of said brakes to braking position but being expandible to return said wormwheel segment into engagement with said worm and to move said brakes out of braking position.

10. In a device of the character described, the combination of an oscillatable shaft, a gate carried by and oscillatable with said shaft, a mechanism to drive said shaft, a brake that is selectively movable to braking position to stop movement of said mechanism or movable out of braking position to permit unbraked movement of said mechanism, a wormwheel segment rotatable to rotate said shaft, a worm gear that is normally engaged by said wormwheel segment and that drives said wormwheel segment, and a brake-actuating element that is registerable with said brake and is responsive to the position of said wormwheel segment to move said brake to braking position, said brake-actuating element being adapted to move said brake toward braking position as one end of said wormwheel segment approaches said worm gear and being adapted to respond to continued movement of said wormwheel segment due to the momentum of said gate to move said brake further into braking position after said wormwheel segment has rotated out of engagement with said worm gear.

11. A crossing gate comprising a shaft, a gate supported by said shaft, a worm gear that can be driven in a forward or reverse direction, a wormwheel segment, said worm wheel segment being connected to and movable with said shaft and said gate, said worm gear normally engaging and driving said wormwheel segment and thereby normally driving said shaft and said gate, compression springs adjacent the ends of travel of said wormwheel segment, and an actuator movable with said wormwheel segment to compress said compression springs whenever said wormwheel segment approaches the ends of its travel, said compression springs being positioned so said wormwheel segment can separate from and move completely out of engagement with said worm gear before said springs are completely compressed, said compression springs biasing said wormwheel segment for movement into engagement with said worm gear whenever said wormwheel segment has separated from and is completely out of engagement with said worm gear.

EDWARD A. BRASS.

REFERENCES CITED

The following references are of record in the file of this patent:

UNITED STATES PATENTS

| Number | Name | Date |
|---|---|---|
| 629,883 | Zielke | Aug. 1, 1899 |
| 1,021,750 | Kleinman | Mar. 26, 1912 |
| 1,639,428 | Daly | Aug. 16, 1927 |
| 1,839,142 | Cullen | Dec. 29, 1931 |
| 1,846,850 | Dixon | Feb. 23, 1932 |
| 1,850,260 | Daly | Mar. 22, 1932 |
| 1,888,058 | Vincent | Nov. 15, 1932 |
| 1,934,429 | Jenkins | Nov. 7, 1933 |
| 1,952,641 | Vincent | Mar. 27, 1934 |
| 1,964,081 | Rausch | June 26, 1934 |
| 2,038,482 | Fereday | Apr. 21, 1936 |
| 2,098,284 | Fraser | Nov. 9, 1937 |
| 2,222,115 | Mott | Nov. 19, 1940 |
| 2,295,419 | Miskelly | Sept. 8, 1942 |
| 2,309,152 | Woodruff et al. | Jan. 26, 1943 |
| 2,342,306 | Silver | Feb. 22, 1944 |
| 2,351,857 | Howe | June 20, 1944 |
| 2,372,579 | Jefferson et al. | Mar. 27, 1945 |